United States Patent [19]

Kishi et al.

[11] Patent Number: 4,636,937
[45] Date of Patent: Jan. 13, 1987

[54] DATA INPUT/OUTPUT UNIT

[75] Inventors: Hajimu Kishi, Hino; Masaki Seki, Suginami; Yutaka Mizuno, Hachioji, all of Japan

[73] Assignee: Fanuc Ltd., Minamitsuru, Japan

[21] Appl. No.: 651,996

[22] PCT Filed: Oct. 14, 1983

[86] PCT No.: PCT/JP83/00357

§ 371 Date: Sep. 28, 1984

§ 102(e) Date: Sep. 28, 1984

[87] PCT Pub. No.: WO84/01646

PCT Pub. Date: Apr. 26, 1984

[30] Foreign Application Priority Data

Oct. 16, 1982 [JP] Japan ............................ 57-181826

[51] Int. Cl.[4] ............................................. G06K 1/02
[52] U.S. Cl. ...................................... 364/191; 371/49
[58] Field of Search ... 364/191, 192, 193, 200 MS File, 364/900 MS File; 371/49

[56] References Cited

U.S. PATENT DOCUMENTS

| | | | |
|---|---|---|---|
| 3,439,341 | 4/1969 | Dolby et al. | 340/152 |
| 3,482,215 | 12/1969 | Murayama | 340/152 |
| 3,629,558 | 12/1971 | Coggin | 340/172.5 |
| 3,632,989 | 1/1972 | Kasischke | 340/152 |
| 3,647,041 | 3/1972 | Davis et al. | 197/187 |
| 3,854,660 | 12/1974 | Henegar | 364/200 |
| 3,890,488 | 6/1975 | Lee et al. | 101/19 |
| 3,915,278 | 10/1975 | Spence et al. | 235/61.9 |
| 3,923,137 | 12/1975 | Kashio | 364/474 |
| 3,975,712 | 8/1976 | Hepworth | 364/200 |
| 3,979,732 | 9/1976 | Hepworth | 364/200 |
| 4,010,356 | 3/1977 | Evans et al. | 235/61.9 R |
| 4,019,036 | 4/1977 | Hiramatsu et al. | 235/151.1 |
| 4,042,866 | 8/1977 | Morita et al. | 318/568 |
| 4,044,328 | 8/1977 | Herff | 371/50 |
| 4,106,091 | 8/1978 | Hepworth | 364/200 |
| 4,163,284 | 7/1979 | Kishi et al. | 364/474 |
| 4,393,493 | 7/1983 | Edwards | 371/49 |
| 4,413,176 | 11/1983 | Onuki | 178/42 |
| 4,501,998 | 2/1985 | Nozawa et al. | 364/141 |
| 4,509,139 | 4/1985 | Creager | 364/900 |
| 4,523,270 | 6/1985 | Kishi et al. | 364/171 |

FOREIGN PATENT DOCUMENTS

| | | |
|---|---|---|
| 2812881 | 3/1973 | Fed. Rep. of Germany . |
| 879187 | 10/1961 | United Kingdom . |
| 1107967 | 1/1966 | United Kingdom . |
| 1062907 | 3/1967 | United Kingdom . |
| 1199510 | 7/1970 | United Kingdom . |

OTHER PUBLICATIONS

Furois et al., "Portable Inventory System and Method", IBM Technical Disclosure Bulletin, vol. 19, No. 5, Oct., 1976, p. 1828.

Primary Examiner—Jerry Smith
Assistant Examiner—Allen MacDonald
Attorney, Agent, or Firm—Staas & Halsey

[57] ABSTRACT

Disclosed is a data input/output unit which is equipped with a control device (1), a tape puncher (5), a tape reader (4) and a printer (6), and which is capable of operating even in response to a command from a host computer. The tape puncher (5) is provided with a counter (5h) for counting the number of print characters in one block, a parity designating circuit (5i) for determining a parity change indicated by a value counted by the counter, and a puncher control circuit (5c) capable of adding or erasing a parity code. The puncher control circuit (5c) performs an addition or erasure of a parity code in response to a parity signal from the parity designating circuit (5i).

3 Claims, 3 Drawing Figures

4,636,937

DATA INPUT/OUTPUT UNIT

CROSS REFERENCES TO RELATED APPLICATIONS

This application is related to U.S. application Ser. No. 651,538.

BACKGROUND OF THE INVENTION

1. Field of the Invention

This invention relates to a transportable data input/output unit capable of being detached from the body of a numerical control device.

2. Description of the Related Art

In numerical control, there are cases where a host computer is used and made to perform a variety of data processing tasks to create command data for the machining of a workpiece. The data created by the host computer is recorded on a paper tape by a tape puncher and, with the paper tape serving as the recording medium, is used as input information for another system. In creating the paper tape, the contents of the tape are printed out by a printer in order to provide a record thereof beforehand. Where an output from the host computer is recorded on the paper tape or printed on recording paper, the paper tape puncher and printer used ordinarily are provided separately from the host computer body. These pieces of peripheral equipment are directly connected to the host computer and operate solely in response to commands therefrom. Unlike a system in which such peripheral equipment is of a disjointed nature, a system is conceivable in which the peripheral equipment operates on the basis of commands from a host computer when connected to the computer, but in which the contents of a paper tape may be read independently and printed for copying purposes when the peripheral equipment is disconnected from the host computer. However, a system such as this can be applied to only very limited systems and is inapplicable to others in certain aspects. Moreover, even where applicable, a disadvantage occurs in that results cannot be obtained unless the host computer software is modified. Furthermore, where numerical control data is to be dealt with, a parity code is sometimes added which will render the length of one block punched into a paper tape an even or odd number. Heretofore, with a paper tape having a parity code, copying the paper tape has meant copying the parity code as well. In cases where data recorded on such a paper tape are read into a numerical control device which does require a parity code, the parity code is meaningless information which has the deleterious effect of delaying data processing. Conversely, when a paper tape not furnished with a parity code is copied, providing the tape with a parity code is impossible when attempted.

SUMMARY OF THE INVENTION

Accordingly, an object of the present invention is to provide a data input/output unit for a numerical control device in a numerical control system, wherein the input/output unit is detachable from a host computer and includes a tape puncher, tape reader and printer combined into one, and wherein the operation of removing parity from data provided with parity, or of adding parity to data devoid of such parity, is capable of being performed by the data input/output unit itself or based on a command from a host computer.

The present invention provides a processing function which not only enables a data input/output unit to operate in accordance with a command from a host computer in order to create a paper tape, print out transferred data and enter data, but which also enables the unit itself to be programmed independently to create a paper tape and print the data borne by the paper tape. A tape puncher is provided with a counter for counting the number of print characters in one block, a parity designating circuit for determining a parity change indicated by the value counted by the counter, and a puncher control circuit capable of adding or erasing a parity code. In response to a parity signal from the parity designating circuit, the puncher control circuit performs at least an addition or erasure of a parity code. According to the present invention, the operation of removing parity from data provided with parity, or of adding parity to data devoid of such parity, is capable of being performed by the data input/output unit itself or based on a command from a host computer.

DESCRIPTION OF THE PREFERRED EMBODIMENTS

Figure 1:
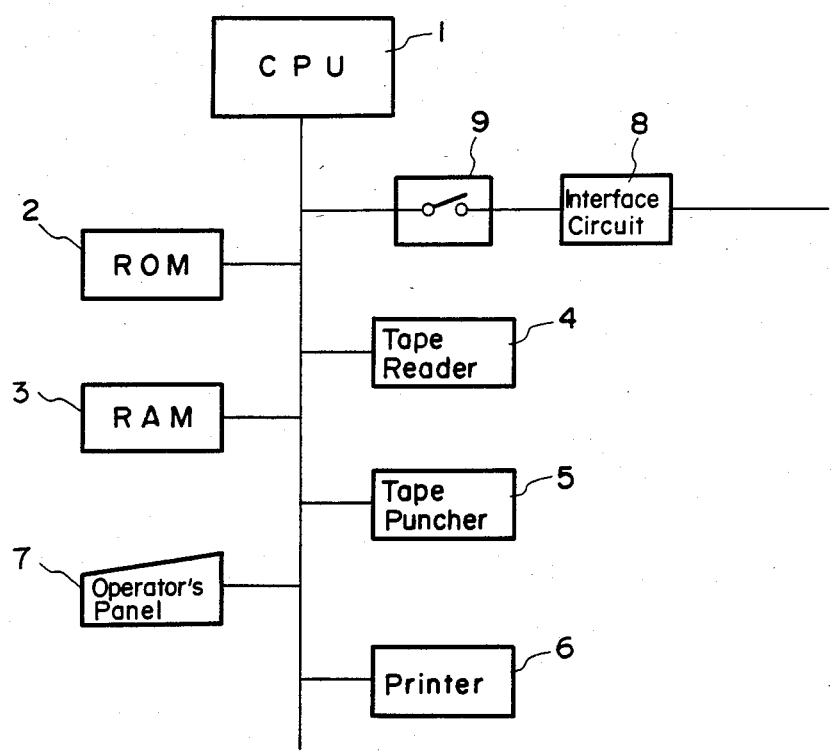
FIG. 1 is a block diagram of a data input/output unit according to the present invention.

An embodiment of the present invention will now be described in detail with reference to the drawings. FIG. 1 is a block diagram of a data input/output unit according to the present invention. In the Figure, numeral 1 denotes a control device, 2 a read-only memory (hereafter abbreviated to "ROM") storing a program necessary for operating the data input/output unit, 3 a random-access memory (hereafter abbreviated to "RAM") for temporarily storing data or the like read from a paper tape or the like, 4 a tape reader, 5 a tape puncher, and 6 a printer for printing data read by the tape reader, data punched by the tape puncher 5, or data received from a host computer. Numeral 7 denotes an operator's panel having character keys, numeric keys, function keys and the like. In particular, the panel has an operation changeover switch for deciding whether operation is by a command from the host computer or whether the data input/output unit of the present invention is to operate independently. Numeral 8 is an interface circuit for interfacing the host computer. Numeral 9 designates a changeover circuit.

The unit shown in FIG. 1 is capable of performing the following operations by itself. Specifically, data entered from the operator's panel 7 can be printed out immediately by the printer and the data can be stored in the RAM 3. In addition, after the results of the print-out are checked, errors in the data stored in the RAM 3 can be corrected. After the correction operation, the data stored in the RAm 3 can be printed out and punched in a paper tape as well. Furthermore, data read from the tape reader 4 can be printed out by the printer 6 and punched in a paper tape by the tape puncher 5 to create a copy of the paper tape. These operations can be performed simultaneously.

The data input/output unit shown in FIG. 1 can be connected to a host computer by turning on the changeover circuit 9 through manipulation of the operation changeover switch provided on the operator's panel 7, and data can be transferred from the operator's panel 7 or tape reader 4 to the host computer through the RAM 3 or by by-passing the RAM. In addition, data transferred from the host computer can be recorded on a paper tape by the tape puncher 5, and the data can also be printed out by the printer 6.

Figure 2:
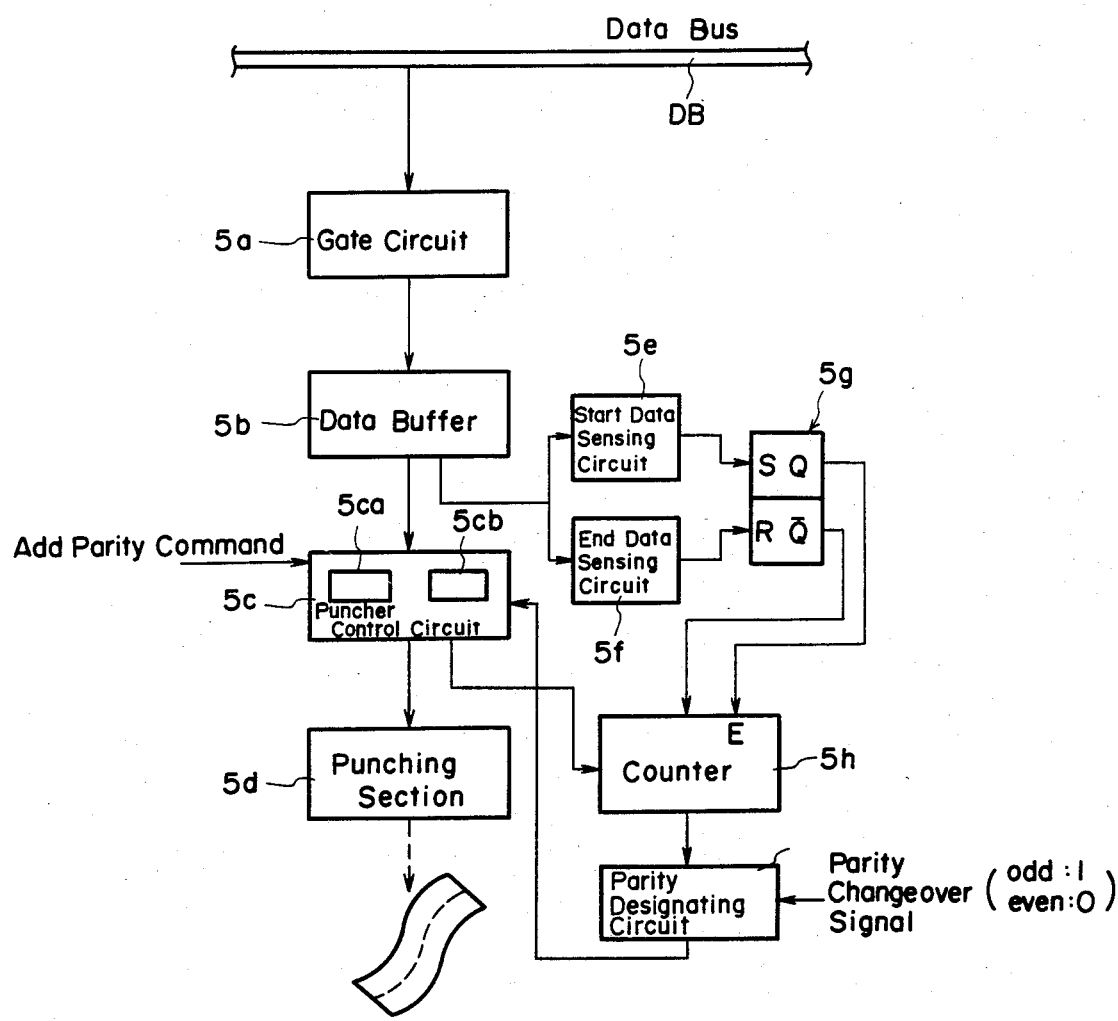
FIG. 2 is a block diagram showing the constitution of a tape puncher.

FIG. 2 is a block diagram showing the constitution of the tape puncher 5. In the Figure, numeral 5a denotes a gate circuit, 5b a data buffer, and 5c a puncher control circuit in which there are provided a register 5ca for storing two punch codes, and a gate 5cb. Data from the data buffer 5b passes through the register 5ca in serial fashion. Numeral 5d denotes a punching section, 5e a start data sensing circuit, 5f an end data sensing circuit, 5g a flip-flop circuit (hereafter referred to as an "FF circuit"), 5h a counter for counting the number of print characters, and 5i a parity designating circuit. If an odd number is designated by a parity changeover signal, the circuit 5j produces a parity signal P when the counted value delivered by the counter 5h is odd. If an even number is designated by the parity changeover signal, the circuit 5j produces a parity signal P when the counted value delivered by the counter 5h is even.

Figure 3:
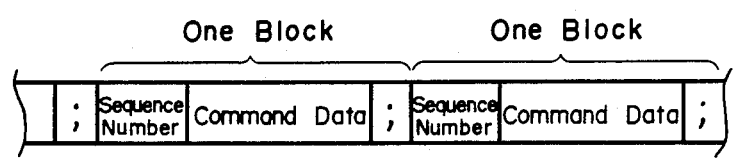
FIG. 3 is a view showing the arrangement of command data recorded on a paper tape.

As shown in FIG. 3, one block of numerical control data recorded on a paper tape starts from an initial sequence number code and ends with an end-of-block code ";". When the start data sensing circuit 5e, which incorporates a decoder for sensing the sequence number code, senses this code, the circuit produces a "1" output. when the end data sensing circuit 5f, which incorporates a decoder for sensing the end-of-block code ";", senses this code, the circuit produces a "1" output.

The operation of the tape puncher 5 shown in FIG. 2 will now be described. Described first will be a case where parity is added to data devoid of parity in data having a length of one block, with the data then being punched into a paper tape. Punch data from the data bus DB applied to the data buffer 5b via the gate circuit 5a is delivered to the puncher control circuit 5c. Upon sensing a sequence number code in the data received, the start data sensing circuit 5e sets the FF circuit 5g. The set signal Q enables the counter 5h, the counted value of which has been cleared. Punch data thenceforth is delivered as an output by the data buffer 5b, the data passes through the register 5ca of the puncher control circuit 5c, the output of which is a punch command delivered to the punching section 5d. The punching section 5d punches a code, which has received the punch command, into the paper tape. The puncher control circuit 5c produces a single pulse each time an item of punch data is applied thereto. The counter 5h counts the number of pulses to count the number of print characters.

The FF circuit 5g is reset when the end-of-block code ";" is sensed in the print data delivered by the data buffer 5b. The reset signal $\overline{Q}$ halts the counting operation performed by the counter. The value of the count recorded by the counter 5h is then applied to the parity designating circuit 5i. If the value of the count indicates that a parity code is necessary, the parity signal P is produced. This signal is delivered to the puncher control circuit 5c. When this signal is received at the puncher control circuit 5c, a space code used as a parity code is inserted between the end-of-block code ";" stored in the register 5ca and the code stored ahead of the end-of-block code. The resulting space code punch command is delivered to the punching section 5d. A paper tape punched in this manner has a parity code added thereto.

Described next will be a case where a paper tape is created by removing a parity code from data provided with a parity code. Punch data from the data bus DB applied to the data buffer 5b via the gate circuit 5a is delivered to the puncher control circuit 5c. Upon sensing a sequence number code in the data received, the start data sensing circuit 5e sets the FF circuit 5g. The set signal Q enables the counter 5h, the counted value of which has been cleared. Punch data thenceforth is delivered as an output by the data buffer 5b, the data passes through the register 5ca of the puncher control circuit 5c, the output whereof is a punch command delivered to the punching section 5d. The punching section 5d punches a code, corresponding to the punch command, into the paper tape. The puncher control circuit 5c produces a single pulse each time an item of punch data is applied thereto. The counter 5h counts the number of pulses to count the number of print characters.

The FF circuit 5g is reset when the end-of-block code ";" is sensed in the print data delivered by the data buffer 5b. The reset signal $\overline{Q}$ halts the counting operation performed by the counter. The value of the count recorded by the counter 5h is then applied to the parity designating circuit 5i. If the value of the count indicates that a parity code is necessary, the parity signal P is produced. If the indication is that no parity code is necessary, then the parity signal P is not produced. This signal is delivered to the puncher control circuit 5c. When this signal is received at the puncher control circuit 5c, the signal is discriminated. When the signal P is not produced, the gate circuit 5cb is closed to one code and the register 5ca does not output that code if the code preceding the end-of-block code is a parity code, whereby the transmission of the one code (a space code serving as a parity code) is halted. As a result, no parity code whatsoever is punched into the paper tape. The remaining end-of-block code is punched thereafter.

The foregoing changeover is controlled by a control signal S generated by the host computer side or by the control device 1 itself and delivered via the gate circuit 5a. The tape puncher can be made to perform one or both of the two above-described operations.

Where the tape puncher is not provided with the parity processing function of the type described above and is to perform an ordinary punching operation, it will suffice if the transfer of data to the start data sensing circuit 5e and end data sensing circuit 5f is suspended by the control signal S generated by the host computer or by the control device 1 itself and delivered through the gate circuit 5a.

As described in detail above, the present invention is equipped with a processing function which not only enables a data input/output unit to operate in accordance with a command from a host computer in order to create a paper tape, print out transferred data and enter data, but which also enables the unit itself to be programmed independently to create a paper tape and print the data borne by the paper tape. The present invention therefore serves well as a transportable data input/output unit capable of servicing several numerical control devices. Furthermore, a tape puncher is provided with a counter for counting the number of print characters, a parity designating circuit for determining a parity change indicated by the value counted by the counter, and a puncher control circuit capable of adding and erasing a parity code. In response to a parity signal from the parity designating circuit, the puncher control circuit performs at least an addition or erasure of a parity code. Therefore, when punch data received from a host computer, or data read in from the tape reader 4 of the present input/output unit proper, is processed based on a command from the operator's panel or host computer and is punched out by the tape puncher, the operation of removing parity from data provided with parity, or of adding parity to data devoid of such parity, is capable of being performed by the data input/output unit itself or on the basis of a command from the host computer.

According to the present invention, there can be obtained a data input/output unit which is detachable from a host computer and in which the operation of removing parity from data provided with parity, or of adding parity to data devoid of such parity, is capable of being performed by the data input/output unit itself or on the basis of a command from the host computer. The present invention therefore serves well as a transportable data input/output unit capable of servicing several numerical control devices.

We claim:

1. A data input/output unit capable of being connected to a host computer, comprising:
   a control device operatively connectable to the host computer;
   a read-only memory, operatively connected to said control device, for storing a program necessary for operation of said data input/output unit;
   a random-access memory, operatively connected to said conrol device, for temporarily storing data;
   a tape reader, operatively connected to said control device, for reading data contained by a tape; and
   a tape puncher, operatively connected to said control device, for punching data into a paper tape, said tape puncher comprising:
      a counter for counting the number of print characters in a block;
      a parity designating circuit, operatively connected to said counter, for determining a parity change indicated by a value counted by said counter and producing a parity signal; and
      a puncher control circuit, operatively connected to said parity designating circuit and capable of adding or erasing a parity code, said puncher control circuit performing at least one of an addition and erasure of a parity code in response to the parity signal from the parity designating circuit.

2. A data input/output unit operatively connectable to a host computer, comprising:
   a tape puncher; and
   means, operatively connected to said tape puncher and connectable to the host computer, for adding or erasing a parity code in a data block to be punched on a tape, said means for adding or erasing the parity code comprising:
      a data buffer operatively connectable to the host computer;
      a start data sensing circuit, operatively connected to said data buffer, for sensing the start of the data block;
      an end data sensing circuit, operatively connected to said data buffer, for sensing the end of the data block;
      a puncher control circuit, operatively connected to said data buffer and said tape puncher, for passing the data block therethrough;
      a counter, operatively connected to said puncher control circuit and said start and end data sensing circuits, for counting character codes sent to said tape puncher; and
      a parity designating circuit, operatively connected to said counter and said puncher control circuit, for outputting a parity signal in dependence upon the character code count; and
      said puncher control circuit adding a parity code to the data block in dependence upon the parity signal or removing a parity code when the end of the data block is sensed.

3. A unit as recited in claim 2, wherein said puncher control circuit comprises:
   a register, operatively connected to said data buffer, for storing two punch codes; and
   a gate circuit, operatively connected to said parity designating circuit, for inhibiting output by said register when one of the two punch codes is a parity code, the parity signal indicates no parity and the end of the data block is sensed.

* * * * *

UNITED STATES PATENT AND TRADEMARK OFFICE
CERTIFICATE OF CORRECTION

PATENT NO. : 4,636,937
DATED : January 13, 1987
INVENTOR(S) : Hajimu KISHI, Masaki SEKI, Yutaka MIZUNO It is certified that error appears in the above-identified patent and that said Letters Patent is hereby corrected as shown below:

Column 2, line 24, "invention." should be --invention;--;

line 60, "RAm" should be --RAM--.

Column 5, line 33 "conrol" should be --control--.

Signed and Sealed this

Twenty-first Day of April, 1987

Attest:

DONALD J. QUIGG

Attesting Officer      Commissioner of Patents and Trademarks